United States Patent
Mehta et al.

(10) Patent No.: US 6,583,209 B2
(45) Date of Patent: Jun. 24, 2003

(54) PROPYLENE POLYMER COMPOSITES HAVING IMPROVED MELT STRENGTH

(75) Inventors: Sameer D. Mehta, Mason, OH (US); Manivakkam J. Shankernarayanan, Cincinnati, OH (US); Harilaos Mavridis, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/947,836

(22) Filed: Sep. 6, 2001

(65) Prior Publication Data

US 2003/0092816 A1 May 15, 2003

(51) Int. Cl.$^7$ ................................................. C08L 3/34
(52) U.S. Cl. ........................ 524/445; 524/236; 524/570; 525/70
(58) Field of Search ................................ 524/445, 570, 524/236; 525/70

(56) References Cited

U.S. PATENT DOCUMENTS

| | | | |
|---|---|---|---|
| 5,759,938 A | * 6/1998 | Cody et al. | 502/62 |
| 5,910,523 A | * 6/1999 | Hudson | 523/213 |
| 5,973,053 A | 10/1999 | Usuki et al. | 524/445 |
| 6,036,765 A | * 3/2000 | Farrow et al. | 106/487 |
| 6,051,643 A | 4/2000 | Hasegawa et al. | 524/445 |
| 6,103,817 A | 8/2000 | Usuki et al. | 524/574 |
| 6,117,932 A | 9/2000 | Hasegawa et al. | 524/445 |
| 6,136,908 A | 10/2000 | Liao et al. | 524/445 |
| 6,225,394 B1 | * 5/2001 | Lan et al. | 524/445 |
| 6,380,295 B1 | * 4/2002 | Ross et al. | 524/443 |
| 6,451,897 B1 | * 9/2002 | Niyogi | 524/445 |
| 6,462,122 B1 | * 10/2002 | Qian et al. | 524/445 |

FOREIGN PATENT DOCUMENTS

| | | | |
|---|---|---|---|
| EP | 0 807 659 B1 | 11/1999 | |
| EP | 1 055 706 A1 | 11/2000 | |
| WO | WO 01/30864 A2 | 5/2001 | |
| WO | WO 01/48080 A1 | * 7/2001 | C08L/23/10 |
| WO | WO 02/066553 A2 | 8/2002 | |

OTHER PUBLICATIONS

Kawasumi, M.; Hasegawa, N.; Kato, M.; Usuki, A.; Okada, A. Macromolecules 1997, 30, 6333–6338.*
Oya, A.: "Polypropylene–Clay Nanocomposites" *Wiley Series in Polymer Science*, John Wiley & Sons, Ltd., Chapter 8, pp. 152–172 (2000).
Oya, A., et al.: "Factors Controlling Mechanical Properties of Clay Mineral/Polypropylene Nanocomposites," *J. Materials Science*, vol. 35: 1045–1050 (2000).
Kurokawa, Y., et al., "Structure and Properties of a Montmorillonite/Polypropylene Nancomposite," *J. Materials Science Letters*, vol. 16: 1670–1672 (1997).
Reichert, P., et al.: "Poly(propylene)/Organoclay Nanocomposite Formation: Influence of Compatibilizer Functionality and Organoclay Modification," *Macromol. Mater. Eng.*, 275: 8–17 (2000).
Zhang, Y.H., et al.: "Effect of Quanternary Ammonium–Modified Montmorillonites on Mechanical Properties of Polypropylene" presented at Materials Research Society Symposium vol. 520 Apr. 13–15, 1998 (San Francsico, CA).
Solomon, M.J., et al.: "Rheology of Polypropylene/Clay Hybrid Materials," *Macromolecules*, vol. 34: 1864–1872 (2001).
Galgali, G., et al.: "A Rheological Study on the Kinetics of Hybrid Formation in Polypropylene Nanocomposites," *Macromolecules*, vol. 34: 852–858 (2001).
Svoboda, P., et al.: Structure and Mechanical Properties of Polypropylene and Polystyrene/Organoclay Nanocomposites, Department of Chemical Engineering, The Ohio State University.
Kodgire, P., et al.: "PP/Clay Nanocomposites: Effect of Clay Treatment on Morphology and Dynamic Mechanical Properties," *J. Applied Science*, vol. 81: 1786–1792 (2001).
Ross, J.F., et al.: "An Improved Gas–Phase Polypropylene Process," *Ind. Eng. Chem. Prod. Res. Dev.*: vol. 24, No. 1; pp. 149–154 (1985).
Hasegawa, N., et al.: "Preparation and Mechanical Properties of Polypropylene–Clay Hybrids Using a Maleic Anhydride–Modified Polypropylene Oligomer," *J. Applied Science*, vol. 67, pp. 87–92 (1998).
Kawasumi, M., et al., "Preparation and Mechanical Properties of Polypropylene–Clay Hybrids," *Macromolecules*: 30, pp. 6333–6338 (1997).
Kim, K–N, et al.: "Mixing Characteristics and Mechanical Properties of Polypropylene–Clay Composites," *ANTEC 2000*, vol. 3, p. 3782–3786.
Kim, J., et al., "Structure and Non–Linear Dynamics of Polypropylene Layered Organoclay Nanocomposite" XIII International Congress on Rheology; Cambridge, UK (2000).

* cited by examiner

*Primary Examiner*—David W. Wu
*Assistant Examiner*—Rip A Lee
(74) *Attorney, Agent, or Firm*—Gerald A. Baracka; William A. Heidrich

(57) ABSTRACT

Propylene polymer composites containing modified clays and compatibilizing agents, more specifically hydrogenated tallow modified montmorillonite and maleic anhydride grafted propylene polymers, are provided. Concentrates or masterbatches used to prepare the composites are also described. The improved composites of the invention exhibit increased melt strength compared to the base resin and to composites similarly formulated using other types of modified clays. Moreover, the improved results are achievable at lower compatibilizer levels and lower ratios of compatibilizer to clay than has heretofore been considered practical.

15 Claims, No Drawings

PROPYLENE POLYMER COMPOSITES HAVING IMPROVED MELT STRENGTH

BACKGROUND OF THE INVENTION

1. Field of the Invention

The invention relates to improved propylene polymer composites and to masterbatch compositions utilized for their preparation. Propylene polymer composites produced in accordance with the invention having increased melt strength and other improved physical properties contain a clay modified with a hydrogenated tallow quaternary ammonium compound and a propylene polymer compatibilizing agent.

2. Description of the Prior Art

Propylene polymer resins have enjoyed significant growth in recent years in view of the diverse resin types which are available. In addition to propylene homopolymer, numerous copolymers of propylene with ethylene and other α-olefins are now commercially produced. These include random copolymers, block copolymers and multi-phase polymer systems. This latter group of resins includes the so-called impact copolymers and thermoplastic elastomers (TPEs) which consist of a continuous phase of a crystalline polymer, e.g., highly isotactic propylene homopolymer, having a rubbery phase, e.g., ethylene-propylene copolymer, dispersed therein.

These resins are widely used in extrusion for the production of films, fibers and wide variety of molded goods, such as bottles, hose and tubing, auto parts and the like. While it is necessary that these resins have sufficiently low melt viscosity under conditions of high shear encountered in the extruder, in order to have acceptable processability and achieve the high throughputs necessary for commercial operations, the resin must also have sufficient melt strength after extrusion to prevent sagging/distortion of the extrudate before it is cooled below the melt point. High melt strength resins are particularly advantageous for the production of large thermoformed and blow molded articles, for extrusion coating and for foamed and sheet extrusions. For example, a blow molding resin suitable for the production of small shampoo bottles may not have sufficient melt strength for the production of one-gallon jugs where the parison is substantially larger and heavier.

The goal of the present invention is to provide propylene polymer composites which exhibit increased melt strength. It is a further objective to accomplish this through the use of a quaternary ammonium—modified clays, thereby achieving the enhanced physical and mechanical properties typically associated with these filled systems.

The use of organically modified clays, sometimes referred to as intercalates or organoclays, produced by a cation exchange reaction between the silicate and alkylammonium salts, especially quaternary ammonium compounds is known in the prior art. The alkyl cations exchanged into and between the clay platelets increase interlayer spacing between adjacent platelets and render the hydrophilic clay organophilic and thus more easily dispersed in thermoplastic resins. Compared to conventional filled thermoplastic compositions, thermoplastics filled with the intercalated organoclays have improved physical properties at similar loading levels.

With polymers which are nonpolar or have low polarity, such as polypropylene, it is generally considered to be necessary to include a compatibilizer resin for effective intercalation. The compatibilizers are most commonly maleic anhydride grafted polypropylene and are employed at a weight ratio of 3:1 (compatibilizer:organoclay). While propylene polymer composites have been prepared using ratios of compatibilizer to organoclay as low as 1:1, these lower ratios are generally considered to be less desirable and, therefore, typically avoided. Hasegawa, et al., in their article entitled "Preparation and Mechanical Properties of Polypropylene-Clay Hybrids Using a Maleic Anhydride Modified Polypropylene Oligomer," JAPS 67, 87 (1998), observed that the particles of the silicate layers became smaller and were dispersed more uniformly as the ratio of the maleic anhydride grafted polypropylene compatibilizer was increased. They further concluded that as the dispersability of the clays was improved, the reinforcement effect of the clays increased.

We have now discovered that by utilizing certain organoclay/compatibilizer combinations, it is possible to significantly improve the melt strength of propylene polymer composites. Furthermore, this improvement is unexpectedly obtained at lower compatibilizer levels and lower ratios of compatibilizer to modified clay than was heretofore considered possible by the prior art.

SUMMARY OF THE INVENTION

The present invention relates to propylene polymer composites having improved melt strength. More specifically, the compositions of the invention comprise a thermoplastic resin composite having improved melt strength comprising: 76 to 99 weight percent, based on the total composition, of a thermoplastic propylene homopolymer, copolymer or blends thereof, 0.5 to 12 weight percent of an organically modified clay consisting of a smectite clay that has been ion-exchanged and intercalated with a quaternary ammonium compound of the formula:

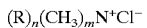

$$(R)_n(CH_3)_m N^+ Cl^-$$

where R represents a hydrogenated tallow moiety, n is 1 to 4, m is 0 to 3 and n+m=4; and 0.5 to 12 weight percent of a propylene polymer compatibilizing agent obtained by copolymerizing or grafting 0.1 to 8 weight percent ethylenically unsaturated carboxylic acid or derivative monomer with propylene. The weight ratio of organically modified clay to compatibilizer will range from 1:5 to 1:0.1.

In a preferred embodiment of the invention the organically modified clay is a montmorillonite clay modified with dimethyl dihydrogenated tallow ammonium chloride and the compatibilizing agent is a propylene homopolymer or copolymer of propylene or ethylene grafted with 0.2 to 2.5 weight percent maleic anhydride. It is especially useful if the modified clay has a modifier concentration of 95 to 140 meq/100 g and the compatibilizing agent has a melt flow from 40 to 400 g/10 min. Preferred composites contain 84 to 98.75 weight percent base resin, 1 to 8 weight percent modified clay and 1 to 8 weight percent comptabilizing agent with the modified clay and compatibilizer present at a weight ratio from 1:1 to 1:0.25.

Concentrates or masterbatches used to prepare the above-described compositions are also claimed herein. The concentrates comprise 20 to 60 weight percent propylene polymer carrier resin selected from the group consisting of propylene homopolymer, propylene copolymer and mixtures thereof and 40 to 80 weight percent additives comprising an organically modified smectite clay that has been ion-exchanged and intercalated with a quaternary ammonium compound of the formula:

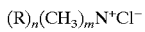

where R represents a hydrogenated tallow moiety, n is 1 to 4, m is 0 to 3 with the proviso that n+m=4; and a propylene polymer compatibilizing agent obtained by copolymerizing or grafting 0.1 to 8 weight percent ethylenically unsaturated carboxylic acid or derivative monomer and 95 to 99.9 weight percent propylene, the weight ratio of organically modified clay to compatibilizing agent ranging from 1:5 to 1:0.1. Preferably, the carrier resin is polypropylene homopolymer. Especially useful concentrates contain 20 to 50 weight percent carrier resin and 50 to 80 weight percent organically modified clay and compatibilizing agent present at a weight ratio from 1:1 to 1:0.25 with up to 5 weight percent other conventional compounding additives.

DETAILED DESCRIPTION

In accordance with the present invention there is provided propylene polymer compositions, also referred to as composites, having increased melt strength as a result of using specific organoclay/compatibilizer combinations. Moreover, with the compositions of the invention it is possible to achieve the desired melt strength improvement and improve other physical properties utilizing significantly lower levels of compatibilizer and lower ratios of compatibilizer to organoclay than heretofore considered possible.

The increased melt strength or melt elasticity of the inventive compositions is evidenced by a noticeable upturn at low frequencies in their dynamic rheological data. By upturn is meant that the dynamic complex viscosity increases with decreasing frequencies at frequencies of less than about 1.0 rad/sec. In contrast, the propylene polymer base resins generally exhibit a limiting constant value at frequencies of about <0.1 rad/sec. This complex viscosity upturn, which is measured in terms of $\Delta G_0^*$, is an indication that the composites of the invention have superior melt strength compared to the base resins. Enhanced melt strength is also indicated by high complex viscosities ($\eta^*$) at low frequencies. The relative increase in complex viscosity of the composite as compared to the base resin is expressed by the ratio of complex viscosity of the composite to the base resin at a frequency of 0.1 radians/second.

$\Delta G_0^*$ is the difference, i.e., increase, in $G_0^*$ obtained for the composite material over the $G_0^*$ value observed for the propylene polymer base resin. It can be expressed by the equation:

$$\Delta G_0^* = (G_0^*)_{composite} - (G_0^*)_{base\ resin}$$

$\Delta G_0^*$ is expressed in dynes/cm2.

In general, the higher the $\Delta G_0^*$ value, the greater the improvement in melt strength of the composite over the base resin. The procedure used to measure the Theological properties of the base resins and composites and determine the viscosity upturn is detailed in the examples.

As will be recognized by those skilled in the art, specific $\Delta G_0^*$ values referred to herein are provided only to demonstrate the viscosity upturn, i.e., melt strength increase, obtained for the composites of the invention and are not intended to be limiting since they are generated under a specific set of conditions. Rheological data generated using different conditions, e.g., temperature, percent strain, plate configuration, etc., could result in $\Delta G_0^*$ and complex viscosity ratio values which are higher or lower than those recited in the specification and claims which follow.

The invention is adaptable for use with any of the widely known and commonly used thermoplastic propylene polymer resins which includes homopolymers, copolymers and blends thereof. Copolymers can include random, block and impact copolymers where propylene is the major, i.e., greater than 50 weight percent, monomer constituent. Comonomers can include ethylene and $C_{4-8}$ α-olefins. Polypropylene homopolymer and random, block and impact copolymers of propylene and ethylene are particularly useful. The propylene polymer blends can be produced by physically blending two or more propylene polymers or they may be reactor-produced blends.

Useful propylene copolymers will contain 55 to 99.5 weight percent propylene and 0.5 to 45 weight percent ethylene. Even more preferred propylene polymer compositions comprise 65 to 99.5 percent propylene and 0.5 to 35 percent ethylene. These weight percentages are for the overall propylene polymer compositions, so that if the composition is comprised of two or more different propylene polymer components, the monomer contents of the individual polymer components comprising the blend may be outside the specified ranges.

A highly useful embodiment utilizes propylene-ethylene copolymers comprised of two phases—a continuous phase of highly isotactic polypropylene homopolymer and a dispersed phase of rubber-like propylene-ethylene copolymer. Depending on the relative proportion of the continuous and disperse phases, these compositions are classified as either impact copolymers or thermoplastic polyolefins (TPOs)—the latter having a significantly higher rubber/elastomer content. Ethylene contents of these polymers will generally range from about 8 weight percent up to about 30 weight percent.

While these types of products can be produced by melt compounding individual polymer components, existing multi-reactor technology makes it possible to directly produce these products. This is conveniently accomplished by polymerizing. propylene in a first reactor and discharging the polypropylene homopolymer from the first reactor into a secondary reactor where propylene and ethylene are copolymerized in the presence of the polypropylene. Gas-phase polymerizations of this type are described in the article by Ross, et al., "An Improved Gas-Phase Polypropylene Process." Ind. Eng. Chem. Prod. Res. Dev. 1985, 24, 149–154.

Typically, in a first reactor, propylene is homopolymerized or it can be copolymerized with a $C_{3-8}$ α-olefin at a temperature from 50° C. to 100° C. and pressure from 250 psig to 650 psig utilizing a titanium catalyst and an organoaluminum cocatalyst. The highly isotactic homopolymer or copolymer produced in the first reactor is then directly fed into a second reactor typically maintained at 25° C. to 80° C. and 100 psig to 500 psig where propylene and ethylene are copolymerized in the presence of the polymer from the first reactor. The amount of ethylene employed in the second reactor is sufficient to produce a copolymer of propylene and ethylene with rubber-like characteristics. Polymerization in the second reactor is generally accomplished without additional catalyst; however, it may be advantageous, to introduce more catalyst to the second reactor. If more catalyst is employed, it can be the same as the catalyst used in the first polymerization or different.

High activity titanium catalysts, activated by contacting with an organoaluminum cocatalyst, are generally utilized for the gas-phase polymerizations. The polymerizations are carried out in the substantial absence of liquid reaction medium and gas velocity within the stirred-bed is maintained below the onset of fluidization. Depending on their compositional makeup, gases can be recirculated through external heat exchangers for cooling or partially condensed. Cooled monomer is recirculated into the reactor and provides thermal control. Recirculated monomer vaporizes when it is introduced into the reactor so that polymerization occurs in the gas phase. In the preferred mode of operation, i.e., stirred, fixed-bed gas phase, the first and second reactors are fitted with spiral agitators to maintain a turbulent mechanically fluidized bed of polymer powder and prevent agglomeration. Hydrogen is generally included in both reactors for control of molecular weight. The amount of hydrogen can range from 0.1 up to about 10 mole percent.

Each reactor typically has its own control system(s) and is capable of independent operation. In the usual conduct of the process, propylene and ethylene monomers are passed through desiccant beds prior to introduction. Means are usually provided to individually meter the propylene, ethylene, hydrogen for molecular weight control, catalyst and cocatalyst. This makes it possible to more readily control and maintain the desired reactor conditions. If desired, monomer may be injected into the recirculated gas stream for introduction into the system. Suitable controls are also provided to vary the pressure, temperature and compositional analysis to facilitate maintaining a constant environment in the reactor and/or to permit adjustment of conditions to bring the system into conformance. Residence times in both reactors are generally on the order of 1 to 4 hours.

Organoclays employed for the invention are smectite-type clays which have been modified by reacting the clay with a quaternary ammonium compound. The resulting cation exchanged clay, due to the incorporation of organic cations between the layers of the clay, exhibits organophilic character and facilitates dispersion in the propylene polymer resin.

Organoclays used for the invention are derived from smectite clays. Smectite clays are well known in the art as are the methods for modification with quaternary ammonium compounds. Representative smectite clays which can be employed include montmorillonite, bentonite, hectorite, saponite, beidellite and the like. Of these clays, montmorillonite clays and, more particularly, montmorillonite clays having an exchange capacity of at least 50 milliequivalents per 100 grams of clay are preferred.

For the purpose of this invention, clays of the above types and particularly montmorillonite clays, are reacted with a quaternary ammonium compound derived from tallow. More specifically, the quaternary ammonium compound corresponds to the formula:

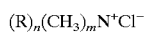

where R represents a hydrogenated tallow moiety, n is 1 to 4, m is 0 to 3 and n+m=4. The tallow moiety, being derived from a natural product, is a mixture of aliphatic radicals typically comprised of predominantly $C_{14-18}$ carbon atoms. The carbon number range and distribution within the carbon number range, i.e., percentage of each component, can vary within limits and will generally be those of tallow fatty acids which are generally derived from beef tallow or mutton tallow. Accordingly, the alkyl substituents will vary depending on factors such as the tallow source, treatment and age of the tallow. Typical values have, however, been generated and are as follow:

| Constituent Fatty Acid | Beef Tallow | Mutton Tallow |
|---|---|---|
| Myristic ($C_{14}$) | 6.3% | 4.6% |
| Palinitic ($C_{16}$) | 27.4% | 24.6% |
| Stearic ($C_{18}$) | 14.1% | 31.5% |
| Oleic ($C_{18:1}$) | 49.6% | 36.0% |
| Linoleic ($C_{18:2}$) | 2.5% | 4.3% |

Source: *CRC Handbook of Chemistry and Physics*, 74$^{th}$ ed. (1993–94), pages 7–29.

When hydrogenated, even allowing for variations in tallow composition referred to above, it is expected that $C_{16-18}$ alkyl substituents will comprise at least 80% by weight and, more typically, at least 90% by weight of the R groups. More specifically, it is anticipated R will be comprised of approximately 5% $C_{14}$, 30% $C_{16}$, and 65% $C_{18}$ alkyl groups.

Montmorillonite clays modified with dimethyl dihydrogenated tallow ammonium chloride (abbreviated 2M2HT) and represented by the formula:

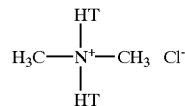

where HT represents the hydrogenated tallow group are particularly effective for the invention. Furthermore, modified clays of this type are available from commercial sources at different modifier concentrations. For example, Southern Clay Products, Inc., offers three montmorillonite clay products modified to different levels with 2M2HT, namely Cloisite® 6A with a modifier concentration of 140 meq/100 g, Cloisite® 15A with a modifier concentration of 125 meq/100 g and Cloisite® 20A with a modifier concentration of 95 meq/100 g. While all three of these modified clays can be employed for the invention, montmorillonite clay modified with 2M2HT at a concentration of 95 meq/100 g is particularly advantageous.

A compatibilizing agent which is a polymer of propylene containing about 0.1 to 8 weight percent ethylenically unsaturated carboxylic acid or derivative monomer either copolymerized or grafted is included with the propylene homopolymer or copolymer and organically modified clay in order to obtain the improved composites of the invention. As used herein the term "grafting" denotes covalent bonding of the grafting monomer to the polymer chain of the propylene polymer.

The monomer is at least one polymerizable, ethylenically unsaturated carboxylic acid or acid derivative monomer, such as an acid anhydride, ester, salt, amide, imide, or the like. Such monomers include but are not limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleoprimaric acid, tetrahydrophthalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride (XMNA).

Maleic anhydride is a preferred monomer for preparation of the compatibilizing agents of the invention. It is particularly advantageous when the maleic anhydride is grafted on the propylene polymer. When the ethylenically unsaturated carboxylic acid or acid derivative monomer is grafted, and particularly when grafting maleic anhydride, the propylene polymer will preferably contain about 0.2 to 2.5 weight percent of the grafting monomer.

The modified, i.e., copolymerized or grafted, propylene polymer compatibilizing agents useful for the invention are comprised predominantly of propylene units grafted or copolymerized with the ethylenically unsaturated carboxylic acid or acid derivative monomer. Other olefinic hydrocarbon monomers may be present with the propylene and ethylenically unsaturated carboxylic acid or acid derivative monomer; however, these will generally constitute less than 35 weight percent and, more typically, less than 25% of the polymer composition. Ethylene and $C_{3-8}$ α-olefins are most commonly used comonomers with propylene for the compatibilizing agents. It is particularly advantageous when the compatibilizing agents are obtained by polymerizing propylene and ethylene with ethylenically unsaturated carboxylic acid or acid derivative monomer or by grafting a propylene-ethylene copolymer with ethylenically unsaturated carboxylic acid or acid derivative monomer. It is even more advantageous where ethylenically unsaturated carboxylic acid or acid derivative monomer is maleic anhydride.

Whether copolymerized or grafted, the ethylenically unsaturated carboxylic acid or acid derivative monomer will be incorporated with the propylene monomer (and other comonomers, if present) or, in the case of grafting, the propylene homopolymer or copolymer in accordance with conventional procedures known to those skilled in the art.

For example, grafted propylene polymer compatibilizers may be prepared in solution, in a fluidized bed reactor, or by melt grafting. Particularly useful modified products are conveniently prepared by melt blending the propylene polymer, in the substantial absence of a solvent, with a free radical generating catalyst, such as a peroxide, and the grafting comonomer using a shear-imparting reactor, such as an extruder reactor. Twin screw extruders, such as those marketed by Werner-Pfleiderer, are especially useful for melt grafting. Since substantial amounts of solvent are to be avoided, the catalyst and graft monomer are preferably added directly to the reactor.

Graft reactions are typically carried out temperatures above the decomposition temperature of the free radical generating catalyst; however, excessive temperatures should be avoided to minimize or avoid rapid vaporization and consequent losses of the catalyst and graft comonomer. A temperature profile where the temperature of the polymer melt is increased over the length of the extruder up to a maximum in the reaction zone and then decreases toward the extruder output is preferred. Temperature attenuation facilitates processing of the resulting modified product for pelletization or the like. When using maleic anhydride and di-tert-butyl peroxide, a preferred free radical initiator, operating temperatures within the extruder generally range from 190° C. up to 215° C.

The grafted propylene polymers have melt flow rates (MFRs) greater than that of the propylene polymer before grafting. Whereas MFRs of the grafted propylene polymer, i.e., compatibilizing agent, may range from about 10 to 1000 g/10 min, the MFR is most generally in the range 40 to 400 g/10 min. MFRs (to be distinguished from melt indexes) are determined in accordance with ASTM D-1238, Condition L (230° C.; 2160 g; 0.0825 in capillary).

In general, the same types of propylene polymers that can be employed as the base resin for the composite compositions can be grafted and used as the compatibilizing agent. This includes propylene homopolymers and propylene copolymers including random, block and impact copolymers as well as blends of these polymers.

The thermoplastic resin compositions of the invention, i.e., composites are prepared by melt compounding the ingredients. Prior to melt compounding all or a portion of the components may be dry blended to facilitate operation. Also, a concentrate or masterbatch containing the modified clay and/or compatibilizing agent and any other additives, such as antioxidants and the like, may be utilized to facilitate mixing with and incorporation in the propylene polymer base resin. The composite materials may be used directly as obtained from the melt compounding operation or, as is more commonly the case, the products may be stored for subsequent use. When the composites are to be retained, they are typically pelletized or put in some other form suitable for handling.

The use of concentrates to effectively incorporate compounding ingredients into polypropylene resins is well known. This procedure is also useful since it minimizes the number of materials which must be stored and handled by processors. The procedure involves preparing a concentrate, i.e., masterbatch, having relatively high concentrations of modified clay and compatibilizing agent (and any other optional additives) and present in the appropriate ratios using a carrier resin in which the additives are readily dispersed and which is compatible with the "end-use" propylene polymer base resin. Typically, the carrier resin used for the concentrate will be the same as the end-use resin or will be a resin from the same polymer family, but possibly having better processability than the end-use resin. The concentrate, typically in pellet form or some other form suitable for handling, is then "letdown" into the propylene polymer base resin to achieve the desired level of organoclay, compatibilizer and other additives desired in the final product.

Concentrates utilized for the present invention generally utilize propylene homopolymer or copolymer, which may be the same or different than the base resin, as the carrier resin. Polypropylene homopolymers are particularly advantageous carrier resins. The concentrates will contain 20 to 60 weight percent carrier resin and 40 to 80 weight percent additive components, which includes the modified clay and compatibilizing agent and, if present, any other optional additive components. The above weight percentages are based on the total concentrate. Especially useful concentrates are comprised of 20 to 50 weight percent carrier resin and 50 to 80 weight percent additive components. The weight ratio of modified clay to compatibilizing agent in the concentrate will be the same as specified for the composites.

The composites are comprised of from 76 to 99 percent of the propylene homopolymer or copolymer base resin with 0.5 to 12 percent of the organically modified clay and 0.5 to 12 percent of the propylene polymer compatibilizing agent. All of the above percentages are weight percentages and are based on the weight of the total composition. Additionally, the weight ratio of organically modified clay to compatibilizer will range from about 1:5 to 1:0.1. Especially useful compositions will contain 84 to 98.75 percent propylene homopolymer or copolymer, 1 to 8 percent organically modified clay and 1 to 8 percent of the compatibilizing agent. Preferred composites have a weight ratio of clay to compatibilizer from 1:1 to 1:0.25.

Conventional compounding additives commonly included in propylene polymer compositions may also be included in the composites of the invention; however, they typically will be present in a combined amount of less than 5 weight percent and, more typically, the total concentration of all additives will not exceed 2 weight percent. Representative additives, which may be optionally included are heat stabilizers, antioxidants, processing aids, nucleating agents, colorants, clarifiers, UV stabilizers, acid scavengers and coupling agents, such as silanes. Additionally, conventional fillers such as talc, can also be employed in which case the total amount of optional additives may be as high as 30 weight percent.

Composites produced in accordance with the invention having improved melt strengths will have MFRs generally in the range 0.1 to 100 g/10 min and, more preferably from 0.25 to 75 g/10 min. $\Delta G_0^*$ values will typically be greater than 50 dyne/cm$^2$. Complex viscosity ratios at low frequency (0.1 radians/sec) are greater than 1.1.

In addition to having enhanced melt strength, composites produced in accordance with the invention can exhibit other improved physical properties compared to compositions prepared using other organically modified clays and compatibilizing agents. For example, improved stiffness and heat distortion may also be obtained with the composites of the invention.

The composites of the invention may be advantageously used for a variety of applications including thermoforming, blow molding, extrusion coating and foamed and sheet extrusion and eliminate many of the problems heretofore observed when processing propylene polymer resins. For example, in blow molding applications the lack of melt strength in conventional polypropylene resins leads to reduced parison hang times, especially when blow molding larger parts which require larger parisons. The upturn in complex viscosity and corresponding increase in melt strength obtained with the composites of the invention increase parison hang times thereby improving the blow molding operation. Also, in thick (0.25–1.5 inch) sheet extrusion processes where conventional polypropylene resins have a tendency to sag as they exit the die and before they contact the chill roll, use of the composite materials of the invention can eliminate or at least significantly reduce sagging and any operational problems associated therewith. Similar advantages over conventional propylene polymer resins are obtained when the composites of the invention are utilized in thermoforming and extrusion coating processes.

The following examples are given to illustrate the scope of the present invention. Because these examples are given for illustrative purposes only, the invention embodied therein should not be limited thereto.

In these examples, Theological properties were determined using a Rheometrics ARES rheometer. Rheological data were generated by measuring dynamic rheology in the frequency sweep mode to obtain complex viscosities ($\eta^*$), storage modulus (G') and loss modulus (G") for frequencies ranging from 0.0251 to 398 rad/sec for each composition. The rheometer was operated at 210° C. in the parallel plate mode (plate diameter 50 mm) in a nitrogen environment (in order to minimize sample oxidation/degradation). The gap in the parallel plate geometry was 1.2–1.4 mm and the strain amplitude was 10 percent (except where noted otherwise). Rheological properties were determined using standard test procedure ASTM D 4440-84.

The measure of viscosity upturn, $\Delta G_0^*$ of each composite was determined from the rheological data using a modified Casson plot of $\sqrt{G^*}$ vs. $\sqrt{\omega}$ wherein G* is the absolute value of dynamic modulus and $\omega$ is the frequency. The five lowest frequency points for each data set were used to obtain an intercept value $G_0^*$ at $\omega=0$ by the linear extrapolation method. $\Delta G_0^*$ is the difference in $G_0^*$ between the composite and the base resin. It is a measure of the upturn, i.e., increase, in complex viscosity of the nanocomposite materials of the invention.

In all of the examples, the organoclay and compatibilizing agent were incorporated into the propylene base resin utilizing a masterbatch procedure. Materbatches/concentrates contained 50 weight percent modified clay and the appropriate amount of compatibilizing agent, depending on the ratio of modified clay to compatibilizing agent desired. The balance of the concentrate for Examples 1, 2, 13 and 14 and comparative examples A, B, C and D was a 0.7 MFR polypropylene homopolymer carrier resin containing 1000 ppm Irganox® 1010, 1000 ppm Irganox® 168, 1000 ppm calcium stearate and 500 ppm dihydrotalcite. For all other examples and comparative examples, the carrier resin was an in-reactor produced propylene-ethylene (11.5%) copolymer having an MFR of 1.6 and containing 1000 ppm Irganox® 626, 1000 ppm Ultranoxe® 626 and 750 ppm calcium stearate. When a silane coupling agent was used, the silane was first added to the modified clay and this mixture then dry blended with the carrier resin (except in comparative examples B and D, where a commercially produced silane pretreated clay was used). The modified clay/carrier resin mixture was then fed into a twin screw extruder along with a side feed of the compatibilizing agent. The strand of molten concentrate exiting the extruder was pelletized in an underwater pelletizer.

To prepare the composite, the appropriate amount of the concentrate pellets were dry blended with pellets of the base resin and compounded on the twin screw extruder. For example, to obtain a composite containing 88% base resin, 6% modified clay, 3% compatibilizing agent and 3% carrier resin 12 parts concentrate (having a weight ratio of modified clay to compatibilizing agent of 1:0.5) was let down into 88 parts base resin.

A ZSK-30 twin screw extruder (30 mm screw diameter; L/D 38.7) was utilized for processing both the masterbatch and composite. The temperature profile of the extruder was as follows:

| | |
|---|---|
| Zone 1 | 150° C. |
| Zone 2 | 180° C. |
| Zones 3–9 | 190° C. |

Materials employed for the examples were as follows:

| | |
|---|---|
| Base Resin 1 (BR1) | polypropylene homopolymer; 12 MFR |
| Base Resin 2 (BR2) | in-reactor produced two-phase propylene polymer resin having 19.5 weight percent ethylene copolymerized; 9.5 MFR |
| Base Resin 3 (BR3) | random propylene-ethylene (3 weight percent) copolymer; 1.9 MFR |
| Modified Clay 1 (MC1) | Cloisite ®20A; modifier concentration 95 meq/100 g |
| Modified Clay 2 (MC2) | Cloisite ®15A; modifier concentration 125 meq/100 g |
| Comparative Modified Clay 1 (CMC1) | Nanocor ®130P; montmorillonite modified with stearylamine |
| Comparative Modified Clay 2 (CMC2) | Nanocor ®131PS; montmorillonite modified with stearylamine and gamma-aminopropyltriethoxysilane. |
| Compatibilizing Agent 1 (CA1) | Polybond ®3200; polypropylene homopolymer grafted with 1 weight percent maleic anhydride; 250 MFR |

-continued

| | |
|---|---|
| Compatibilizing Agent 2 (CA2) | Eastman G3015; polypropylene homopolymer grafted with 2.5 weight percent maleic anhydride; 190 MI |

All percentages in the examples are weight percentages unless otherwise specified.

EXAMPLE 1

A polypropylene homopolymer composite was prepared in accordance with the invention using BR1. The composite contained 6% MC1 and 3% CA1. The concentrate used to prepare this composite also contained 0.52% 3-aminopropyltriethoxysilane. The resulting composite had an MFR of 9.3 g/10 min and exhibited good melt strength. $G_0^*$ for the composite was 9023 dyne/cm, an improvement over the base resin, i.e., $\Delta G_0^*$, of 9010 dyne/cm². The complex viscosity ratio of the composite to the base resin at a frequency of 0.1 radians/sec was 6.4.

EXAMPLE 2

Example 1 was repeated except that the organically modified clay used was MC2. The resulting composite had an MFR of 8.5 g/10 min and $\Delta G_0^*$ of 5699 dyne/cm²—the latter indicating significantly improved melt strength over the base resin.

COMPARATIVE EXAMPLES A AND B

Examples 1 and 2 were repeated except that the clay used was not modified with a hydrogenated tallow quaternary ammonium compound. For these comparative examples, CMC1 and CMC2 which are stearylamine modified clays were used. Whereas slight improvement in Go over the base resin was observed with CMC1 and CMC2, the increase obtained with MC1 and MC2 was surprisingly approximately 13 times and 8 times greater, respectively, compared to the best comparative result. Data for the comparative examples as well as for Examples 1 and 2 and the base resin are provided in Table 1. Rheological properties for Examples 1 and 2 and Comparative Examples A and B were all determined at 20% strain. The $\eta^*$ ratio reported is $(\eta^*_{0.1})_{composite}/(\eta^*_{0.1})_{base\ resin}$.

EXAMPLES 3–8

To demonstrate the ability to dial in the melt strength composites utilizing propylene polymer base resins by varying the amount of modified clay and compatibilizing agent, a series of composites were prepared using BR2, MC1 and CA1. In all of these formulations the weight ratio of modified clay to compatibilizing agent was approximately 1:0.5. To achieve these varied formulations, the amount of concentrate let down into the base resin was varied accordingly. Details of the compositions and properties are set forth in Table 1.

EXAMPLES 9 AND 10

To further demonstrate the versatility of the invention and the ability to vary the compatibilizing agent, BR2 was formulated using 6% MC1 with 3% CA1 and 6% MC1 with 3% CA2. Both composites exhibited greatly increased melt strengths over the base resin. Results are tabulated in Table 1.

EXAMPLES 11 AND 12

To demonstrate the effect of adding silane, four formulations were prepared using BR2. All of the formulations contained 6% MC1 and 3% CA1 but two of the formulations also contained 625 ppm 3-aminopropyltriethoxysilane. $\Delta G_0^*$ for the composites containing the silane was 15618 dyne/cm² (average of two composites) whereas the average $\Delta G_0^*$ for the two composites prepared without the addition of silane was 12371 dyne/cm². Both the composites containing silane and those which had no silane exhibited significantly improved melt strengths as by their higher $G_0^*$ values (compared to the base resin) and $\eta^*$ ratios.

A EXAMPLES 13 AND 14 AND COMPARATIVE EXAMPLES C AND D

Four composites were prepared using BR2. Two of the composites were prepared in accordance with the invention using 6% hydrogenated tallow modified organoclays (MC1 and MC2) and 3% compatibilizing agent CA1. Two comparative composites utilized 6% stearylamine modified organoclays with 3% CA1. All of the composites contained silane coupling agent. The improvement obtained with the composites of the invention is apparent from the data in Table 2. In all instances significantly improved melt strength was exhibited by the composites of the invention versus the comparative composites.

COMPARATIVE EXAMPLES E AND F

To demonstrate the need for both the modified clay and compatibilizing agent, two composites were prepared using BR2. One composite contained 6% MC1 but no compatibilizing agent. The other composite contained 3% CAI but the dimethyl dihydrogenated tallow ammonium chloride modified montmorilonite clay was omitted. All of the composites contained silane coupling agent. Results are provided in Table 1. It is apparent from data that both the dimethyl dihydrogenated tallow ammonium chloride modified clay and maleic anhydride grafted propylene polymer compatibilizing agent are required in order to obtain significant improvement in composite melt strength.

EXAMPLES 15 AND 16

To demonstrate the ability to dial in the melt strength of the composites of the invention, two composites were prepared using a random propylene-ethylene copolymer base resin. For these examples BR3 was formulated with 6% MC1 and 3% CA1. To demonstrate the improved melt strength of these composites, the composites were used to blow mold round fluted one quart bottles and parison hang times compared. The bottles were blown using a Krupp Kautex KEB-3 continuous extrusion blow molding unit. The screw speed was kept constant at 28 rpm and the targeted bottle weight was 45 g. The extruder temperature profile was as follows:

| | |
|---|---|
| Rear Screw | 341° F. |
| Middle Screw | 351° F. |
| Front Screw | 360° F. |
| Head | 370° F. |
| Die | 365° F. |

The melt temperature exiting the die was 378° F. Parison hang times were measured as the time required for the parison to travel a distance of 54 inches. Whereas the hang time for the composite containing 3% modified clay was 28.3 seconds, the hang time for the composite containing 6% modified clay was increased to 32.2 seconds. This increase in hang time demonstrates a practical application for the improved composites of the invention.

TABLE 1

| Product | Base Resin | Modified Clay/% | Compatibilizing Agent/% | Composite Properties | | | |
|---|---|---|---|---|---|---|---|
| | | | | MFR (g/10 min) | $G_O^*$ (dyne/cm$^2$) | $\Delta G_O^*$ (dyne/cm$^2$) | $\eta^*$ ratio |
| BR1 | BR1 | 0 | 0 | 1.3 | 13 | 0 | 1.0 |
| EX 1 | BR1 | MC1/6 | CA1/3 | 9.3 | 9023 | 9010 | 6.4 |
| EX 2 | BR1 | MC2/6 | CA1/3 | 8.5 | 5712 | 5699 | 5.6 |
| Comp. EX A | BR1 | CMC1/6 | CA1/3 | 9.7 | 666 | 653 | 2.3 |
| Comp. EX B | BR1 | CMC2/6 | CA1/3 | 10.8 | 565 | 552 | 2.3 |
| BR2 | BR2 | 0 | 0 | 9.7 | 130 | 0 | 1.0 |
| EX 3 | BR2 | MC1/0.5 | CA1/0.25 | 9.7 | 253 | 123 | 1.1 |
| EX 4 | BR2 | MC1/1 | CA1/0.5 | 9.4 | 424 | 294 | 1.2 |
| EX 5 | BR2 | MC1/2 | CA1/1 | 8.6 | 1269 | 1138 | 1.9 |
| EX 6 | BR2 | MC1/3 | CA1/1.5 | 8.4 | 3163 | 3033 | 3.3 |
| EX 7 | BR2 | MC1/4 | CA1/2 | 7.8 | 7917 | 7787 | 5.7 |
| EX 8 | BR2 | MC1/5 | CA1/2.5 | 6.7 | 12104 | 11974 | 8.2 |
| EX 9 | BR2 | MC1/6 | CA1/3 | 6.3 | 22768 | 22637 | 12.3 |
| EX 10 | BR2 | MC1/6 | CA2/3 | 5.8 | 12224 | 12093 | 7.9 |
| Comp. EX E | BR2 | 0 | CA1/3 | 9.1 | 126 | -4 | 1.0 |
| Comp. EX F | BR2 | MC1/6 | 0 | 8.8 | 577 | 447 | 1.6 |

TABLE 2

| Product | Base Resin | Modified Clay/% | Compatibilizing Agent/% | Composite Properties | | | |
|---|---|---|---|---|---|---|---|
| | | | | MFR (g/10 min) | $G_O^*$ (dyne/cm$^2$) | $\Delta G_O^*$ (dyne/cm$^2$) | $\eta^*$ ratio |
| BR2 | BR2 | 0 | 0 | 9.3 | 118 | 0 | 1.0 |
| EX 13 | BR2 | MC1/6 | CA1/3 | 6 | 18442 | 18324 | 9.8 |
| EX 14 | BR2 | MC2/6 | CA1/3 | 5.9 | 12882 | 12765 | 7.0 |
| Comp. EX C | BR2 | CMC1/6 | CA1/3 | 6.9 | 10816 | 10698 | 6.1 |
| Comp. EX D | BR2 | CMC2/6 | CA1/3 | 8.1 | 10201 | 10083 | 5.9 |

We claim:

1. A thermoplastic resin composite having improved melt strength comprising:
   (a) 76 to 99 weight percent, based on the total composition, of a thermoplastic propylene copolymer base resin selected from the group consisting of random propylene-ethylene copolymer and two-phase compositions comprising a continuous phase of highly isotactic polypropylene homopolymer and a dispersed phase of rubber-like Ipropylene-ethylene copolymer;
   (b) 0.5 to 12 weight percent of an organically modified clay consisting of a smectite clay that has been ion-exchanged and intercalated with a quaternary ammonium compound of the formula:

$(R)_n(CH_3)_m N^+Cl^-$ where R represents a hydrogenated tallow moiety, n is 1 to 4, m is 0 to 3 with the proviso that n+m=4; and
   (c) 0.5 to 12 weight percent of a propylene copolymer compatibilizing agent having a melt flow rate from 40 to 400 g/10 min. and obtained by grafting 0.2 to 2.5 weight percent maleic anhydride and 97.5 to 99.8 weight percent propylene-ethylene copolymer, the weight ratio of (b):(c) ranging from 1:5 to 1:0.1.

2. The composite of claim 1 wherein the organically modified clay is a montmorillonite clay modified with dimethyl dihydrogenated tallow ammonium chloride.

3. The composite of claim 2 wherein the organically modified clay has a modifier concentration of about 95 to 140 meq/100 g.

4. The composite of claim 1 wherein the weight ratio of organically modified clay to compatibilizing agent is from 1:1 to 1:0.25.

5. The composite of claim 1 having a melt flow rate from about 0.1 to 100 g/10 min.

6. The composite of claim 1 having a $\Delta G_O^*$ greater than 50 dyne/cm$^2$.

7. The composite of claim 1 having a complex viscosity ratio at 0.1 radians/second greater than 1.1.

8. The composite of claim 1 having a melt flow rate from about 0.1 to 100 g/10 min and comprising 84 to 98.75 weight percent propylene copolymer containing 55 to 99.5 weight percent propylene and 0.5 to 45 weight percent ethylene, 1 to 8 weight percent montmorillonite clay modified with dimethyl dihydrogenated tallow ammonium chloride and having a modifier concentration of about 95 to 140 meq/100 g and 1 to 8 weight percent propylene copolymer compatibilizing agent.

9. The composite of claim 8 wherein the propylene copolymer is a two-phase composition comprised of a continuous phase of highly isotactic polypropylene homopolymer and a dispersed phase of rubber-like propylene ethylene copolymer.

10. A concentrate useful for the preparation of composites having improved melt strength comprising 20 to 60 weight percent propylene polymer carrier resin selected from the group consisting of propylene homopolymer, propylene copolymer and mixtures thereof and 40 to 80 weight percent additives comprising an organically modified clay consisting of a smectite clay that has been ion-exchanged and intercalated with a quaternary ammonium compound of the formula:

$(R)_n(CH_3)_m N^+Cl^-$ where R represents a hydrogenated tallow moiety, n is 1 to 4, m is 0 to 3 with the proviso that n+m=4 and a propylene polymer compatibilizing agent obtained by copolymerizing or grafting 0.1 to 8 weight percent ethylenically unsaturated carboxylic acid or derivative monomer and 95 to 99.9 weight percent propylene, the weight ratio of organically modified clay to compatibilizng agent ranging from 1:5 to 1:0.1.

11. The concentrate of claim 10 optionally containing up to 5 weight percent conventional compounding additives.

12. The concentrate of claim 10 wherein the carrier resin is propylene homopolymer.

13. The concentrate of claim 12 wherein the organically modified clay is a montmorillonite clay modified with dimethyl dihydrogenated tallow ammonium chloride and having a modifier concentration of 95 to 140 meq/100 g.

14. The concentrate of claim 13 werein the compatibilizing agent is a propylene homopolymer grafted with 0.2 to 2.5 weight percent maleic anhydride.

15. The concentrate of claim 14 containing 20 to 50 weight percent carrier resin and 50 to 80 weight percent additives and wherein the weight ratio of organically modified clay to compatibilizing agent is from 1:1 to 1:0.25.

* * * * *